United States Patent
Mei et al.

(10) Patent No.: US 12,056,427 B1
(45) Date of Patent: Aug. 6, 2024

(54) NUMERICAL EXPERIMENTAL METHOD FOR URBAN WATERLOGGING

(71) Applicant: China Institute of Water Resources and Hydropower Research, Beijing (CN)

(72) Inventors: Chao Mei, Beijing (CN); Hongyuan Shi, Beijing (CN); Jiahong Liu, Beijing (CN); Hao Wang, Beijing (CN); Xichao Gao, Beijing (CN); Jia Wang, Beijing (CN); Tianxu Song, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 18/516,988

(22) Filed: Nov. 22, 2023

(30) Foreign Application Priority Data

Apr. 26, 2023 (CN) .......................... 202310465663.X

(51) Int. Cl.
| | | |
|---|---|---|
| G06F 30/28 | (2020.01) | |
| G06F 111/10 | (2020.01) | |
| G06F 113/08 | (2020.01) | |

(52) U.S. Cl.
CPC .......... *G06F 30/28* (2020.01); *G06F 2111/10* (2020.01); *G06F 2113/08* (2020.01)

(58) Field of Classification Search
CPC ... G06F 30/28; G06F 2113/08; G06F 2111/10
USPC .......................................................... 703/2
See application file for complete search history.

(56) References Cited

FOREIGN PATENT DOCUMENTS

| | | | |
|---|---|---|---|
| CN | 108763615 A | * | 11/2018 |
| CN | 108763615 A | | 11/2018 |
| CN | 110287595 A | | 9/2019 |
| CN | 110400014 A | | 11/2019 |
| CN | 110909485 A | | 3/2020 |

(Continued)

OTHER PUBLICATIONS

Jiahong Liu, et al., Urban flood analysis for different design storm hyetographs in Xiamen Island based on TELEMAC-2D, Chin Sci Bull, 2019, pp. 2055-2066, vol. 64, No. 19, Science China Press. (Year: 2019).*

(Continued)

*Primary Examiner* — John E Johansen
(74) *Attorney, Agent, or Firm* — Bayramoglu Law Offices LLC

(57) ABSTRACT

A numerical experimental method for urban waterlogging includes the following steps: acquiring raw data of an urban underlying surface; batch-processing urban waterlogging modeling data; batch-running urban waterlogging numerical experimental models; batch-processing urban waterlogging numerical experimental results; and displaying and analyzing the batch-processed urban waterlogging numerical experimental results. The numerical experimental method constructs a numerical experimental process, which can perform an unlimited number of repeated experiments in the numerical simulation process of urban waterlogging and achieve batch-running of data preprocessing, model operation, and data post-processing processes. Therefore, the numerical experimental method has the advantages of high efficiency, high convenience, high reliability, and low cost.

3 Claims, 4 Drawing Sheets

(56) References Cited

FOREIGN PATENT DOCUMENTS

| CN | 111369059 A | 7/2020 |
|---|---|---|
| CN | 111651885 A | 9/2020 |
| CN | 111985129 A | 11/2020 |
| CN | 114067019 A | 2/2022 |
| CN | 114254561 A | 3/2022 |
| CN | 114548680 A | 5/2022 |
| CN | 114997541 A | 9/2022 |
| CN | 115240076 A | 10/2022 |
| KR | 20050090158 A | 9/2005 |
| KR | 20230055060 A | 4/2023 |
| WO | 2022007398 A1 | 1/2022 |
| WO | 2023016036 A1 | 2/2023 |

OTHER PUBLICATIONS

Guo, Bin, Reza Ahmadian, and Roger A. Falconer. "Influence of different momentum sources on modelling tidal lagoons." Proceedings of the 38th IAHR World Congress, Panama City. 2019. (Year: 2019).*

Ligier, Pierre-Louis. "Implementation of a rainfall-runoff model in TELEMAC-2D." Proceedings of the XXIIIrd TELEMAC_MASCARET User Conference. vol. 11. 2016. (Year: 2016).*

Telemac Modelling System Release 7.0 User Manual [2014]. pp. 1-125. (Year: 2014).*

Jiahong Liu, et al., Urban flood analysis for different design storm hyetographs in Xiamen Island based on TELEMAC-2D, Chin Sci Bull, 2019, pp. 2055-2066, vol. 64, No. 19, Science China Press.

Haijin Zhu, et al., Batch Extraction of Digital Elevation Model Terrain Data Based on python, Geospatial Information, 2013, pp. 136-138, V, vol. 11, No. 5.

Liu Jiahong, et al., Effectiveness of urban inundation control system in sponge city construction, Advances in Water Science, 2020, pp. 611-618, vol. 31, No. 4.

Du Tian, et al., Multi-source Geographic Data Efficient Quality Inspection System Based on Python, Journal of Geomatics, 2020, pp. 84-88, vol. 45, No. 5.

Liu Yong, et al., Research on urban flood simulation: a review from the smart city perspective, Progress in Geography, 2015, pp. 494-504, vol. 34, No. 4.

ASCII (American Standard Code for Information Interchange), Cryptography, Information Theory, and Error-Correction: A Handbook for the 21st Century, 2005, pp. 445-446, John Wiley & Sons, Inc.

* cited by examiner

Elevation    CN value    Manning coefficient

NUMERICAL EXPERIMENTAL METHOD FOR URBAN WATERLOGGING

CROSS REFERENCE TO THE RELATED APPLICATIONS

This application is based upon and claims priority to Chinese Patent Application No. 202310465663.X, filed on Apr. 26, 2023, the entire contents of which are incorporated herein by reference.

TECHNICAL FIELD

The present disclosure relates to the technical field of numerical simulation, and in particular to a numerical experimental method for urban waterlogging.

BACKGROUND

Due to a multitude of factors such as climate change and urbanization, urban waterlogging disasters occur frequently worldwide. In China, cities that experience waterlogging during the flood season every year spread all over the country. Frequent urban waterlogging disasters seriously threaten safe operations and sustainable developments of cities. Effective prevention and control of urban waterlogging requires a scientific analysis of the formation mechanism and evolution characteristics of urban waterlogging.

At present, the main methods for researching the formation mechanism and evolution characteristics of urban waterlogging include numerical simulation, experimental research, and on-site monitoring. The main limitations of the experimental research method are attributed to large investment, long cycle, and small experimental scale, making it hard to conduct an unlimited number of repeated experiments. The on-site monitoring method has problems of high cost and large difficulty in data acquisition and requires a lot of manpower and material resources, and monitoring equipment is easily affected by complex environments.

SUMMARY

In response to the above shortcomings existing in the prior art, the present disclosure provides a numerical experimental method for urban waterlogging. The present disclosure solves the following problems existing in the prior art. The experimental research method has problems of large investment, long cycle, and small experimental scale, making it hard to conduct an unlimited number of repeated experiments. The on-site monitoring method has the problems of high data cost and large difficulty in data acquisition, requires a lot of manpower and material resources, and cannot protect the monitoring equipment from complex environmental impacts.

To achieve the above objective, the present disclosure adopts the following technical solution. A numerical experimental method for urban waterlogging includes the following steps:

S1: acquiring raw data of an urban underlying surface;
S2: batch-processing urban waterlogging modeling data based on the raw data of the urban underlying surface;
S3: batch-running urban waterlogging numerical experimental models based on the batch-processed data;
S4: batch-processing urban waterlogging numerical experimental results based on the batch-running results; and
S5: displaying and analyzing the batch-processed urban waterlogging numerical experimental results.

The above technical solution has the following beneficial effects. The above technical solution can achieve an unlimited number of repeated experiments in the numerical simulation process of urban waterlogging, and achieve batch-running of data preprocessing, model operation, and data post-processing processes. The above technical solution solves the following problems. The experimental research method has problems of large investment, long cycle, and small experimental scale, making it hard to conduct an unlimited number of repeated experiments. The on-site monitoring method has the problems of high data cost and large difficulty in data acquisition, requires a lot of manpower and material resources, and cannot protect the monitoring equipment from complex environmental impacts.

Further, in step S1, the raw data of the urban underlying surface include urban building data, urban road data, urban greening data, and urban river water system data.

The above further solution has the following beneficial effects. The above further solution simulates scenarios of various urban underlying surfaces, and can acquire more effective information to analyze the formation mechanism and evolution characteristics of urban waterlogging.

Further, step S2 further includes: modeling, by a TELEMAC-2D model.

The above further solution has the following beneficial effects. The TELEMAC-2D model has strong parallel capabilities and is suitable for high-performance computing, simplifying the calculations to analyze the formation mechanism of urban waterlogging.

Further, the TELEMAC-2D model uses a non-conservative two-dimensional (2D) shallow-water dynamic equation, with water depth and flow velocity as variables, and uses a step-by-step algorithm based on a feature line method, including the following sub-steps:

A1: in a first time step: linearizing a convection term related to the 2D shallow-water dynamic equation, and discretizing and solving the convection term through a finite element method; and A2: in a second time step: linearizing a propagation term, a diffusion term, and a source term of the 2D shallow-water dynamic equation, and discretizing and solving the propagation term, the diffusion term, and the source term through the finite element method.

The above further solution has the following beneficial effects. The above technical solution adopts a 2D shallow-water dynamic equation and a step-by-step algorithm based on a feature line method, which can reliably simulate the formation of urban waterlogging.

Further, the 2D shallow-water dynamic equation includes:

$$\frac{\partial h}{\partial t} + \frac{\partial (hu)}{\partial x} + \frac{\partial (hv)}{\partial y} = Sce$$

where Sce denotes the source term; u and v denote flow velocities in x- and y-directions, respectively; t denotes a time; h denotes a water depth; and $\partial$ denotes seeking a partial derivative;

$$\frac{\partial u}{\partial t} + u\frac{\partial u}{\partial x} + v\frac{\partial u}{\partial y} = -g\frac{\partial Z}{\partial x} + F_x + \frac{1}{h}div(hv_e\nabla u)$$

-continued
$$\frac{\partial v}{\partial t} + u\frac{\partial v}{\partial x} + v\frac{\partial v}{\partial y} = -g\frac{\partial Z}{\partial y} + F_y + \frac{1}{h}div(hv_e\nabla v)$$

where Z denotes an elevation of a free water surface; g denotes an acceleration of gravity; $F_x$ and $F_y$ denote resistance components in the x- and y-directions, respectively; $v_e$ denotes an effective viscosity coefficient; div denotes a divergence calculation symbol; and $\nabla$ denotes a gradient operation symbol.

The above further solution has the following beneficial effects. The above technical solution provides a 2D shallow-water dynamic equation, using water depth and flow velocity as variables to analyze the formation of urban waterlogging.

Further, the TELEMAC-2D model includes an infiltration module that uses a soil conservation service curve number (SCS-CN) method and reflects an infiltration capability through a CN value; and the SCS-CN method includes an SCS model expressed as follows:

$$Q = \frac{(P - I_a)^2}{(P - I_a) + S}$$

$$S = 25.4 \times \left(\frac{1000}{CN} - 10\right)$$

where Q denotes a runoff volume; P denotes a rainfall volume; $I_a$ denotes an initial loss value; S denotes a maximum water storage volume of soil, and S takes a value expressed in form of the CN value; and the CN value falls in a range of 0 to 100.

The above further solution has the following beneficial effects. According to the above equation, the further solution determines the infiltration capacity of the infiltration part in the TELEMAC-2D model based on the CN value, in order to complete the simulation of rainfall runoff.

Further, step S2 includes the following sub-steps:
S2-1: converting the raw data of the urban underlying surface into matrix files, including elevation data, land use data, Manning coefficient, and research area boundary data;
S2-2: batch-processing the matrix files through a Python program; and
S2-3: reading coordinate files with parameter attributes of elevation data, land use data, Manning coefficient, and research area boundary data; performing data partitioning based on a research area boundary file; setting a constraint to remove non-compliant data; and renaming retained data, and exporting multiple sets of experimental data.

The above further solution has the following beneficial effects. The above technical solution converts and batch-processes the raw data of the urban underlying surface, and achieves batch-processing of the data through the Python program, ultimately acquiring multiple sets of batch-generated experimental data.

Further, step S3 includes: batch-running the urban waterlogging numerical experimental models through the Python program according to the following sub-steps:
S3-1: defining a function; selecting some data files from multiple sets of batch-generated system log file (slf) experimental data, and moving the data files into a same folder; specifying a file path and a new path of a generated folder; creating a new folder based on a file name, and moving a file into the folder;
S3-2: defining a function to unify data file names and identify folder paths, sub-folder names, and all file names in the path; and renaming a file with a desired data suffix to a unified name;
S3-3: starting the program to set a variable of a runtime environment, calling a model parameter, and starting the running program; and
S3-4: defining a function to uniformly copy configuration files required for running the models to each folder in the new path, and running the models in sequence to achieve batch-running of an unlimited number of numerical experimental models.

The above further solution has the following beneficial effects. The above technical solution selects certain data sets from the multiple sets of batch-generated experimental data, and processes and runs the selected data sets through the Python program to achieve batch-running of the numerical experimental models.

Further, step S4 includes the following sub-steps:
S4-1: extracting batch-running result files; traversing all files in a result folder path through the Python program; returning and splitting all paths; and returning a tuple of path names and file extensions;
S4-2: extracting uniformly named result files in each folder to a new path, and naming the result files in sequence, ensuring a one-to-one correspondence between names and the result files;
S4-3: batch-analyzing the extracted result files, and reading data of all steps in the result file through a defined function; and
S4-4: calculating eigenvalues in the step data through the defined function, and looping the eigenvalues into a comma separated value (CSV) file to save as table data, thereby completing batch-processing of the numerical experimental results.

The above further solution has the following beneficial effects. The above technical solution extracts the batch-running result filesning and calculates the eigenvalues, thereby completing the batch-analysis and processing of data.

Further, in step S4-4, the calculating eigenvalues includes:
calculating a total water storage amount $Q_{max}$ as follows:

$$Q_{max} = \text{Max} \sum_{i=1}^{n} (\Delta S * \bar{h})$$

where Max denotes taking a maximum value; i denotes a selected triangular mesh; n denotes a number of triangular meshes; $\Delta S$ denotes a water area per unit of triangular mesh; and $\bar{h}$ denotes an average water depth at three points of the triangular mesh;
considering a triangular mesh with an average water depth of more than 5 cm at the three points as a watered triangular mesh, and calculating a water area S as follows:

$$\bar{h} = (h_1 + h_2 + h_3)/3 > 0.05$$

$$\Delta S = (1/2) * (x_1 * y_2 + x_2 * y_3 + x_3 * y_1 - x_1 * y_3 - x_2 * y_1 - x_3 * y_2)$$

$$S = \sum_{i=1}^{n} \Delta S$$

where $h_1$, $h_2$, and $h_3$ denote water depths at the three points of the triangular mesh, respectively; and $(x_1,y_1)$, $(x_2,y_2)$ and $(x_3,y_3)$ denote coordinates of the three points of the triangular mesh, respectively;

taking a maximum value of water depth h in an entire time series as a maximum water depth $h_{max}$; and taking a maximum value of flow velocity V in the entire time series as a maximum flow velocity $V_{max}$.

The above further solution has the following beneficial effects. According to the above equations, the above further solution acquires the total water storage amount, the water area, the maximum water depth, and the maximum flow velocity, thereby completing the calculation of the eigenvalues.

DETAILED DESCRIPTION OF THE EMBODIMENTS

The present disclosure will be further described below in conjunction with the drawings and specific examples.

Figure 1:
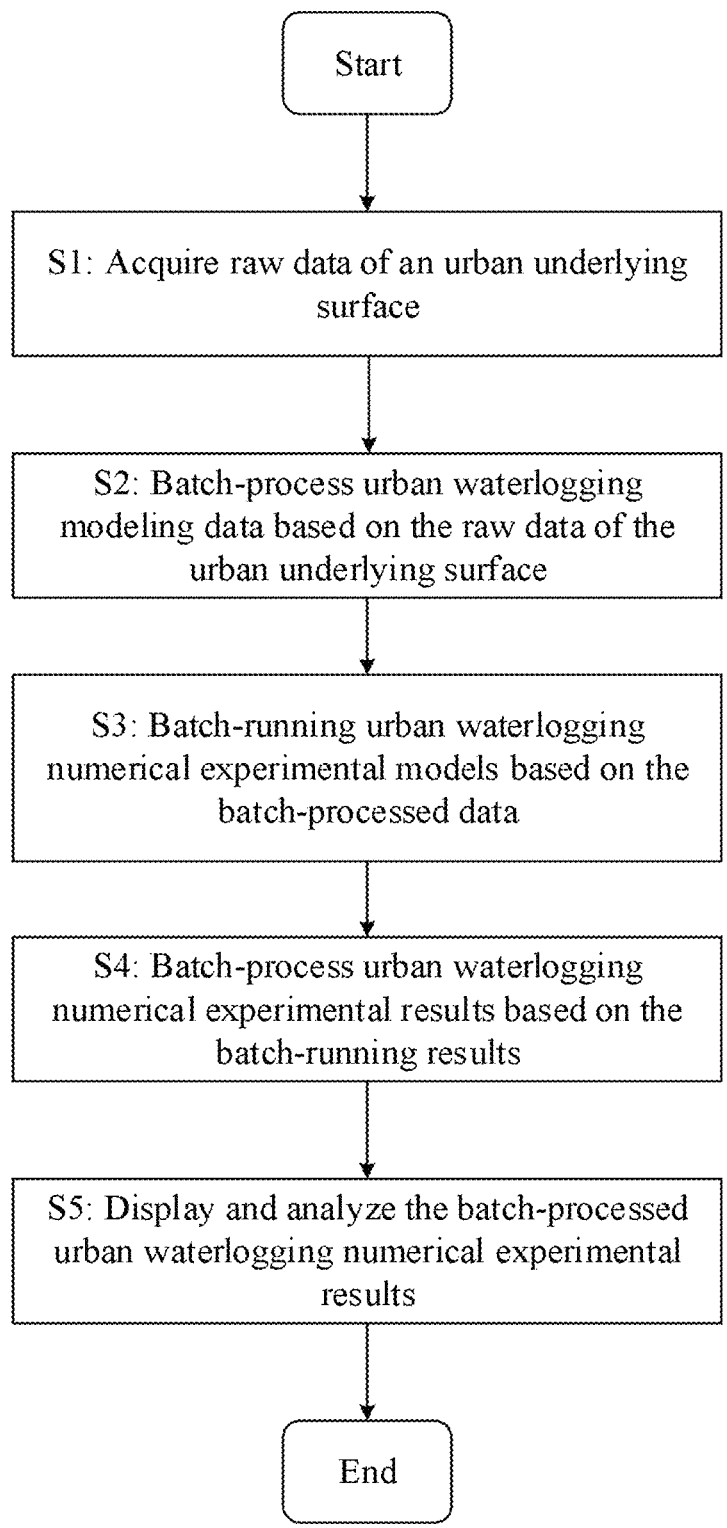
FIG. 1 is a flowchart of a numerical experimental method for urban waterlogging.

As shown in FIG. 1, a numerical experimental method for urban waterlogging includes the following steps.

S1. Raw data of an urban underlying surface are acquired.

S2. Urban waterlogging modeling data are batch-processed based on the raw data of the urban underlying surface.

S3. Urban waterlogging numerical experimental models are batch-run based on the batch-processed data.

S4. Based on the batch-running results, urban waterlogging numerical experimental results are batch-processed.

S5. The batch-processed urban waterlogging numerical experimental results are displayed and analyzed.

In step S1, the raw data of the urban underlying surface include urban building data, urban road data, urban greening data, and urban river water system data.

In step S1, the raw data of the urban underlying surface are acquired according to the following means. (1) Remote sensing data. Publicly available remote sensing data are downloaded for underlying surface analysis, or analyzed land cover data are directly downloaded for experimental data preparation. Remote sensing data is commonly used in numerical experiments, which has the advantages of large data volume, rich types, and good timeliness. Mainly, the contours of urban roads and other elements are identified through remote sensing images, and different conditions are selected for urban underlying surfaces based on different experimental needs. (2) Artificial selection. Mainly, research is conducted through specific urban underlying surface research areas. This means has strong specificity and is usually a data acquisition method for a specific research purpose. (3) Data planning. Planning on existing data is usually a complex data engineering task that consumes a lot of manpower and resources, but the secondary processing of data meets research needs and coordinates research methods and solutions.

Step S2 further includes modeling by a TELEMAC-2D model.

The TELEMAC-2D model uses a non-conservative two-dimensional (2D) shallow-water dynamic equation, with water depth and flow velocity as variables, and uses a step-by-step algorithm based on a feature line method, including the following sub-steps.

A1. In a first time step, a convection term related to the 2D shallow-water dynamic equation is linearized, and discretized through a finite element method; and A2. In a second time step, a propagation term, a diffusion term, and a source term of the 2D shallow-water dynamic equation are linearized, and discretized through the finite element method.

The 2D shallow-water dynamic equation includes:

$$\frac{\partial h}{\partial t} + \frac{\partial (hu)}{\partial x} + \frac{\partial (hv)}{\partial y} = Sce$$

where Sce denotes the source term; u and v denote flow velocities in x- and y-directions, respectively; t denotes a time; h denotes a water depth; and $\partial$ denotes seeking a partial derivative;

$$\frac{\partial u}{\partial t} + u\frac{\partial u}{\partial x} + v\frac{\partial u}{\partial y} = -g\frac{\partial Z}{\partial x} + F_x + \frac{1}{h}div(hv_e\nabla u)$$

$$\frac{\partial v}{\partial t} + u\frac{\partial v}{\partial x} + v\frac{\partial v}{\partial y} = -g\frac{\partial Z}{\partial y} + F_Y + \frac{1}{h}div(hv_e\nabla v)$$

where Z denotes an elevation of a free water surface; g denotes an acceleration of gravity; $F_x$ and $F_y$ denote resistance components in the x- and y-directions, respectively; $v_e$ denotes an effective viscosity coefficient; div denotes a divergence calculation symbol; and $\nabla$ denotes a gradient operation symbol.

The TELEMAC-2D model includes an infiltration module that uses a soil conservation service curve number (SCS-CN) method and reflects an infiltration capability through a CN value; and the SCS-CN method includes an SCS model expressed as follows:

$$Q = \frac{(P - I_a)^2}{(P - I_a) + S}$$

$$S = 254 \times \left(\frac{1000}{CN} - 10\right)$$

where Q denotes a runoff volume; P denotes a rainfall volume; $I_a$ denotes an initial loss value; S denotes a maximum water storage volume of soil, and S takes a value expressed in form of the CN value; and the CN value falls in a range of 0 to 100.

Step S2 includes the following sub-steps.

S2-1. The raw data of the urban underlying surface are converted into matrix files, including elevation data, land use data, Manning coefficient, and research area boundary data.

S2-2. The matrix files are batch-processed through a Python program.

S2-3. Coordinate files with parameter attributes of elevation data, land use data, Manning coefficient, and research area boundary data are read. Data partitioning is performed based on a research area boundary file. A constraint is set to remove non-compliant data. Retained data are renamed, and multiple sets of experimental data are exported.

Step S3 includes batch-running the urban waterlogging numerical experimental models through the Python program according to the following sub-steps.

S3-1. A function is defined. Some data files are selected from multiple sets of batch-generated system log file (slf) experimental data, and moved into a same folder. A file path and a new path of a generated folder are specified. A new folder is created based on a file name, and a file is moved into the folder.

S3-2. A function is defined to unify data file names and identify folder paths, sub-folder names, and all file names in the path. A file is renamed with a desired data suffix to a unified name.

S3-3. The program is started to set a variable of a runtime environment, a model parameter is called, and the running program is started.

S3-4. A function is defined to uniformly copy configuration files required for running the models to each folder in the new path, and the models are run in sequence to achieve batch-running of an unlimited number of numerical experimental models.

Step S4 includes the following sub-steps.

S4-1. Batch-running result files are extracted, all files in a result folder path are traversed through the Python program, all paths are returned and split, and a tuple of path names and file extensions is returned.

S4-2. Uniformly named result files in each folder are extracted to a new path, and the result files are named in sequence, ensuring a one-to-one correspondence between names and the result files.

S4-3. The extracted result files are batch-analyzed, and data of all steps in the result file are read through a defined function.

S4-4. Eigenvalues in the step data are calculated through the defined function, and the eigenvalues are looped into a comma separated value (CSV) file to save as table data, thereby completing batch-processing of the numerical experimental results.

In step S4-4, the eigenvalues are calculated as follows.

A total water storage amount $Q_{max}$ is calculated as follows:

$$Q_{max} = \text{Max} \sum_{i=1}^{n} (\Delta S * \bar{h})$$

where Max denotes taking a maximum value; i denotes a selected triangular mesh; n denotes a number of triangular meshes; $\Delta S$ denotes a water area per unit of triangular mesh; and $\bar{h}$ denotes an average water depth at three points of the triangular mesh.

A triangular mesh with an average water depth of more than 5 cm at the three points is considered as a watered triangular mesh, and a water area S is calculated as follows:

$$\bar{h} = (h_1 + h_2 + h_3)/3 > 0.05$$

$$\Delta S = (1/2) * (x_1 * y_2 + x_2 * y_3 + x_3 * y_1 - x_1 * y_3 - x_2 * y_1 - x_3 * y_2)$$

$$S = \sum_{i=1}^{n} \Delta S$$

where $h_1$, $h_2$, and $h_3$ denote water depths at the three points of the triangular mesh, respectively; and $(x_1, y_1)$, $(x_2, y_2)$ and $(x_3, y_3)$ denote coordinates of the three points of the triangular mesh, respectively.

A maximum value of water depth h in an entire time series is taken as a maximum water depth $h_{max}$.

A maximum value of flow velocity V in the entire time series is taken as a maximum flow velocity $V_{max}$.

Figure 2:
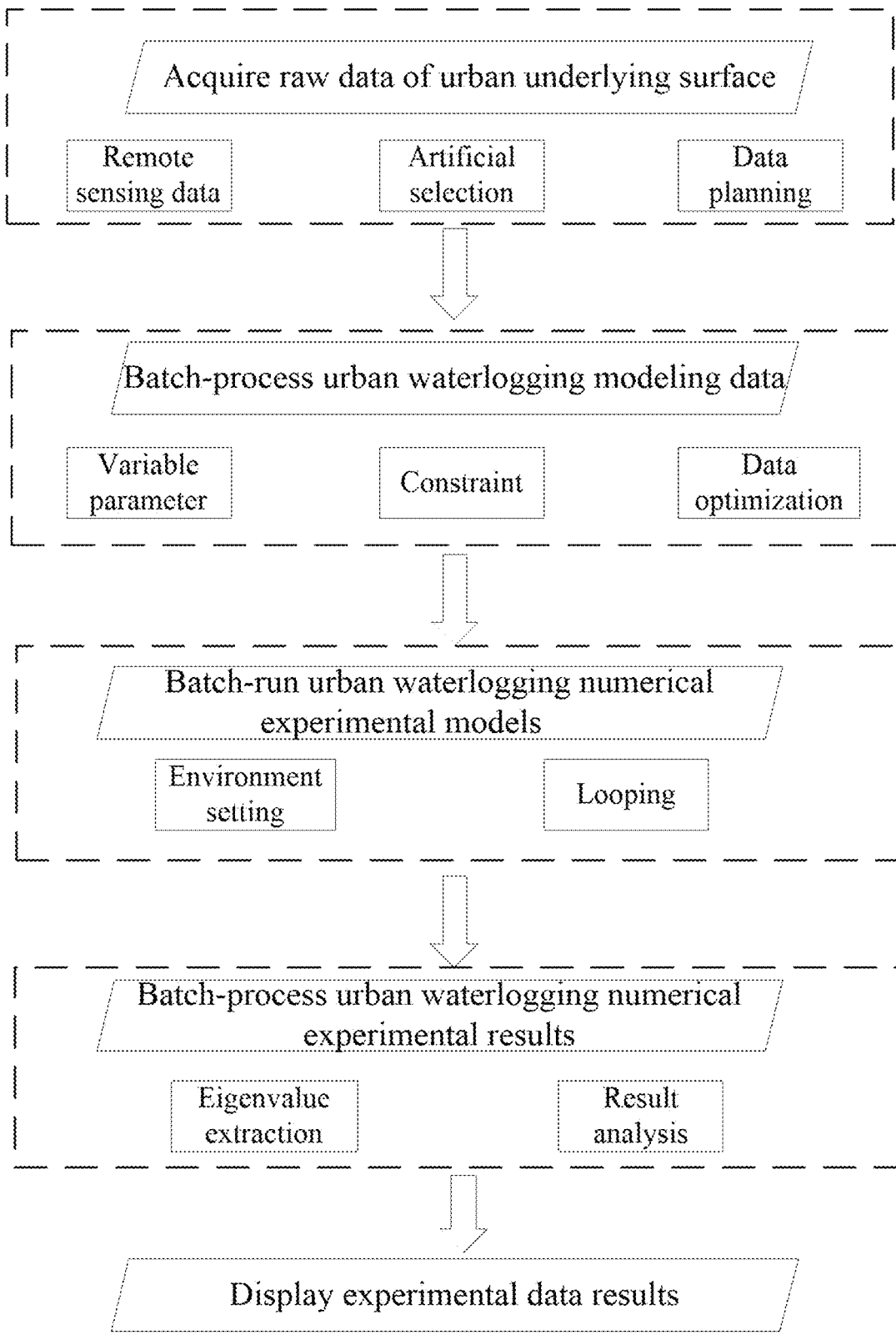
FIG. 2 is a block diagram of the numerical experimental method for urban waterlogging.

As shown in FIG. 2, in an example of the present disclosure, basic layout data of urban road network buildings are downloaded from the official website of CADmapper (https://cadmapper.com/). Data from public sources such as OpenStreetMap, National Aeronautics and Space Administration (NASA), and United States Geological Survey (USGS) are converted into organized computer aided design (CAD) files, and generated data are selected through manual settings. The main data format is drawing exchange format (dxf).

Figure 3:
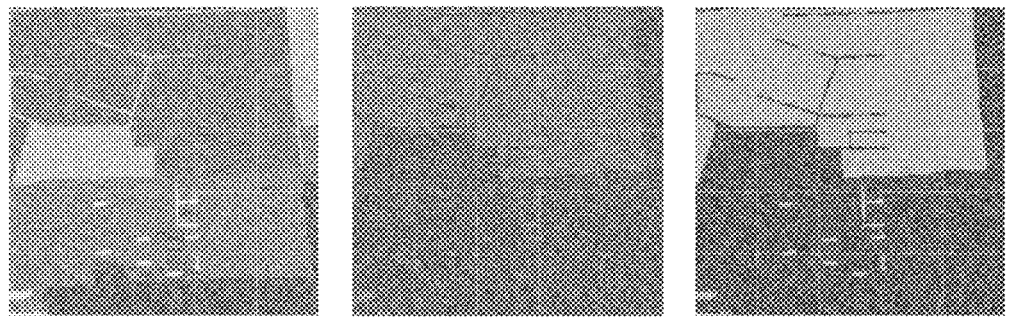
FIG. 3 is a schematic diagram of integration of 100 sets of system log file (slf) basic data.
Figure 3:
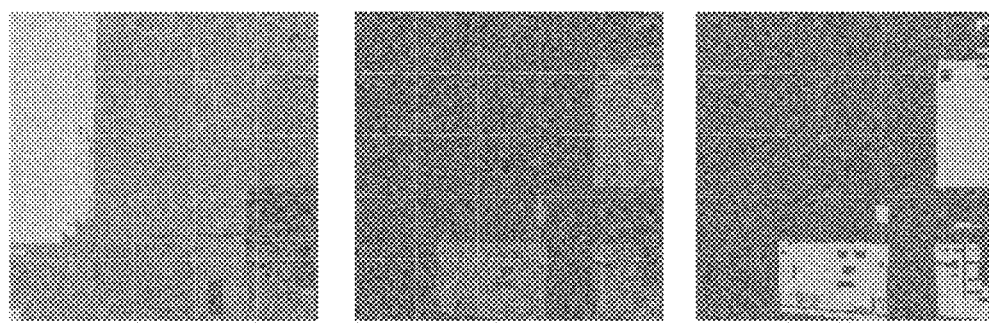
Figure 3:
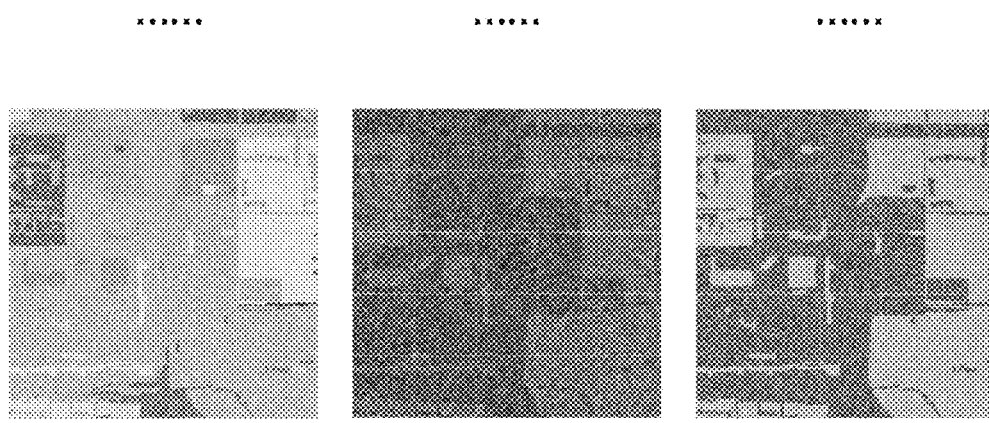

The downloaded data is processed by ArcGIS to trim and organize the files, preserving the elements of roads, buildings, and green spaces in the urban layout. ASCII format files are generated through built-in tools to prepare for the next step of random slicing. Batch-processing is implemented through the Python program. Firstly, American Standard Code for Information Interchange (ASCII) files with elevation, land use, and Manning coefficient parameter attributes are read. Then, the data are partitioned based on boundary files, and the coordinates of the research area are fixed to randomly stack the preprocessed data. A constraint is set to remove data that does not meet the research significance (including inapplicable conditions, for example, land use parameters with only one type in the research area, and coordinate parameters with null values), while data required for the research are retained. Finally, the data are renamed, and 100 sets of slf file data are exported for batch-running. The process is shown in FIG. 3.

Batch-running is also implemented through Python. 100 sets of slf files are organized into a folder. The urban waterlogging numerical experiment is simulated using the TELEMAC-2D hydrodynamic model. Firstly, a runtime environment is generated. A move function is defined to unify the batch-generated slf files into a same folder. A path where the files are placed and a new path (newpath) of the generated folder are specified. A new folder is created based on the file name, and the files are moved to the folder. A modify_slf_name function is defined to unify slf file names, and folder paths, sub-folder names, and all file names in the path (path) are acquired through an os.walk method. A file with a .slf suffix is renamed to a unified name. Then, a TELEMAC program is started to set runtime environment variables, and model parameters are called. Finally, the TELEMAC program (running_telemac) is started and run, and a copy_file function is defined to copy cli, txt, cas, f files, etc. required for running the models to a folder in each newpath. The models are run in sequence. The result files are extracted and sorted to acquire 100 slf result files.

Figure 4:
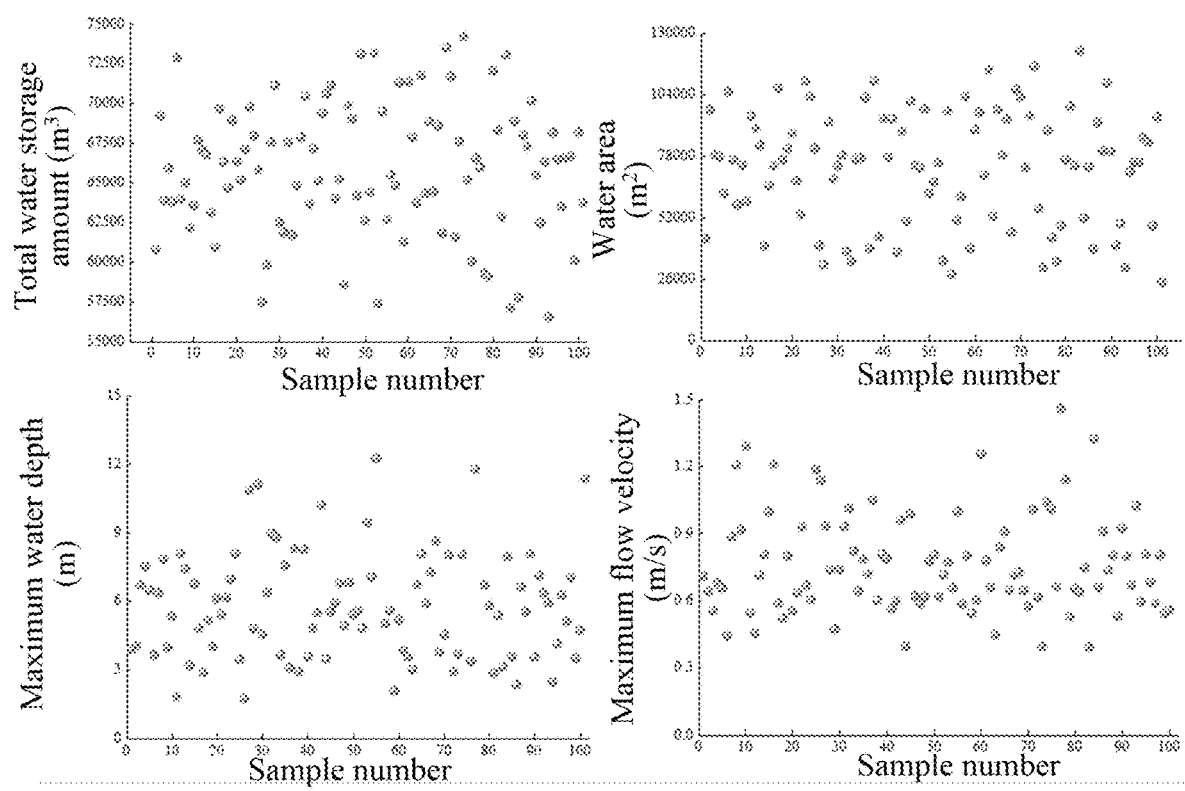
FIG. 4 is a scatter plot of eigenvalues.

As shown in FIG. 4, the 100 slf result files are batch-analyzed. All files in the result folder path are traversed by Python, and a function is defined to read data of all steps in the data file. Eigenvalues in the triangular mesh of each step are calculated in sequence: total water storage (water storage), water area (water area), maximum water depth (max_waterdepth), and maximum flow velocity (max velocity). The eigenvalues are looped into a CSV file and saved as table data.

In the present disclosure, the numerical simulation method can perform an unlimited number of repeated simulations of urban waterlogging in a set scenario. The numerical simulation method can utilize data of underlying surfaces and rainfalls with different characteristics for scenario simulation, thereby acquiring a large amount of simulation data to analyze the formation mechanism and evolution characteristics of urban waterlogging, with relatively small human and material investment and low cost. The numerical simulation method constructs a numerical experimental process, which can achieve an unlimited number of repeated experiments in the numerical simulation process of urban waterlogging. In addition, the numerical simulation method achieves batch-running of data preprocessing, model operation, and data post-processing processes, and has the advantages of high efficiency, high convenience, high reliability, and low cost.

Those of ordinary skill in the art will understand that the examples described herein are intended to help readers understand the principles of the present disclosure, and it should be understood that the protection scope of the present disclosure is not limited to such special statements and examples. Those of ordinary skill in the art may make other various specific modifications and combinations according to the technical teachings disclosed in the p resent disclosure without departing from the essence of the present disclosure, and such modifications and combinations still fall within the protection scope of the present disclosure.

What is claimed is:

1. A method for preventing urban waterlogging, comprising the following steps:
   S1: acquiring remote sensing data of an urban underlying surface, wherein the remote sensing data identifies contours of urban roads;
   S2: batch-processing urban waterlogging modeling data based on the remote sensing data of the urban underlying surface to obtain batch-processed data;
   S3: batch-running urban waterlogging numerical experimental models based on the batch-processed data to obtain batch-running results;
   S4: batch-processing urban waterlogging numerical experimental results based on the batch-running results to obtain batch-processed urban waterlogging numerical experimental results;
   S5: displaying and analyzing the batch-processed urban waterlogging numerical experimental results; and
   S6: preventing and controlling the urban waterlogging by utilizing the batch-processed urban waterlogging numerical experimental results;
   wherein step S2 further comprises: modeling, by a TELEMAC-2D model;
   wherein the TELEMAC-2D model uses a non-conservative two-dimensional (2D) shallow-water dynamic equation, with water depth and flow velocity as variables, and uses a step-by-step algorithm based on a feature line method, comprising the following sub-steps:
     A1: in a first time step: linearizing a convection term related to the 2D shallow-water dynamic equation, and discretizing and solving the convection term through a finite element method; and
     A2: in a second time step: linearizing a propagation term, a diffusion term, and a source term of the 2D shallow-water dynamic equation, and discretizing and solving the propagation term, the diffusion term, and the source term through the finite element method;

wherein the 2D shallow-water dynamic equation comprises:

$$\frac{\partial h}{\partial t} + \frac{\partial (hu)}{\partial x} + \frac{\partial (hv)}{\partial y} = Sce$$

wherein Sce denotes the source term; u and v denote flow velocities in x- and y-directions, respectively; t denotes a time; h denotes a water depth; and ∂ denotes seeking a partial derivative;

$$\frac{\partial u}{\partial t} + u\frac{\partial u}{\partial x} + v\frac{\partial u}{\partial y} = -g\frac{\partial Z}{\partial x} + F_x + \frac{1}{h}div(hv_e \nabla u)$$

$$\frac{\partial v}{\partial t} + u\frac{\partial v}{\partial x} + v\frac{\partial v}{\partial y} = -g\frac{\partial Z}{\partial y} + F_y + \frac{1}{h}div(hv_e \nabla v)$$

wherein Z denotes an elevation of a free water surface; g denotes an acceleration of gravity; $F_x$ and $F_y$ denote resistance components in the x- and y-directions, respectively; $V_e$ denotes an effective viscosity coefficient; div denotes a divergence calculation symbol; and ∇ denotes a gradient operation symbol;

the TELEMAC-2D model comprises an infiltration module that uses a soil conservation service curve number (SCS-CN) method and reflects an infiltration capability through a CN value; and the SCS-CN method comprises an SCS model expressed as follows:

$$Q = \frac{(P - I_a)^2}{(P - I_a) + S}$$

$$S = 254 \times \left(\frac{1000}{CN} - 10\right)$$

wherein Q denotes a runoff volume; P denotes a rainfall volume; $I_a$ denotes an initial loss value; S denotes a maximum water storage volume of soil, and S takes a value expressed in form of the CN value; and the CN value falls in a range of 0 to 100;

step S2 comprises the following sub-steps:
  S2-1: converting the remote sensing data of the urban underlying surface into matrix files, comprising elevation data, land use data, Manning coefficient, and research area boundary data;
  S2-2: batch-processing the matrix files through a Python program; and
  S2-3: reading coordinate files with parameter attributes of elevation data, land use data, Manning coefficient, and research area boundary data; performing data partitioning based on a research area boundary file; setting a constraint to remove non-compliant data; and renaming retained data, and exporting multiple sets of experimental data;

step S3 comprises: batch-running the urban waterlogging numerical experimental models through the Python program according to the following sub-steps:
  S3-1: defining a function; selecting some data files from multiple sets of batch-generated system log file (slf) experimental data, and moving the data files into a same folder; specifying a file path and a new path of a generated folder; creating a new folder based on a file name, and moving a file into the folder;

S3-2: defining a function to unify data file names and identify folder paths, sub-folder names, and all file names in the path; and renaming a file with a desired data suffix to a unified name;

S3-3: starting the program to set a variable of a runtime environment, calling a model parameter, and starting the running program; and S3-4: defining a function to uniformly copy configuration files required for running the models to each folder in the new path, and running the models in sequence to achieve batch-running of an unlimited number of numerical experimental models; and step S4 comprises the following sub-steps:

S4-1: extracting batch-running result files; traversing all files in a result folder path through the Python program; returning and splitting all paths; and returning a tuple of path names and file extensions;

S4-2: extracting uniformly named result files in each folder to a new path, and naming the result files in sequence, ensuring a one-to-one correspondence between names and the result files;

S4-3: batch-analyzing the extracted result files, and reading data of all steps in the result file through a defined function; and S4-4: calculating eigenvalues in the step data through the defined function, and looping the eigenvalues into a comma separated value (CSV) file to save as table data, thereby completing batch-processing of the numerical experimental results.

2. The method for preventing urban waterlogging according to claim 1, wherein in step S1, the remote sensing data of the urban underlying surface comprise urban building data, urban road data, urban greening data, and urban river water system data.

3. The method for preventing urban waterlogging according to claim 1, wherein in step S4-4, the calculating eigenvalues comprises:

calculating a total water storage amount $Q_{max}$ as follows:

$$Q_{max} = \text{Max} \sum_{i=1}^{n} (\Delta S * \bar{h})$$

wherein Max denotes taking a maximum value; i denotes a selected triangular mesh; n denotes a number of triangular meshes; $\Delta S$ denotes a water area per unit of triangular mesh; and $\bar{h}$ denotes an average water depth at three points of the triangular mesh;

considering a triangular mesh with an average water depth of more than 5 cm at the three points as a watered triangular mesh, and calculating a water area S as follows:

$$\bar{h} = (h_1 + h_2 + h_3)/3 > 0.05$$

$$\Delta S = (1/2) * (x_1 * y_2 + x_2 * y_3 + x_3 * y_1 - x_1 * y_3 - x_2 * y_1 - x_3 * y_2)$$

$$S = \sum_{i=1}^{n} \Delta S$$

wherein $h_1$, $h_2$, and $h_3$ denote water depths at the three points of the triangular mesh, respectively; and $(x_1,y_1)$, $(x_2,y_2)$ and $(x_3,y_3)$ denote coordinates of the three points of the triangular mesh, respectively;

taking a maximum value of water depth h in an entire time series as a maximum water depth $h_{max}$; and taking a maximum value of flow velocity V in the entire time series as a maximum flow velocity $V_{max}$.

* * * * *